(12) United States Patent
Steen et al.

(10) Patent No.: US 7,374,322 B2
(45) Date of Patent: May 20, 2008

(54) CENTER HIGH MOUNTED STOP LAMP INCLUDING LEDS AND TIR LENS

(76) Inventors: Ronald L. Steen, 7828 Brookpines Dr., Clarkston, MI (US) 48348; Kyle P Lucas, 350 N. Rochester Rd., Apt. 103, Clawson, MI (US) 48017; Richard A. Dymond, 5333 Bridges cove, Metamora, MI (US) 48455; Charles D. McKittrick, 1903 N. Main St., Apt. A3, Royal Oak, MI (US) 48073

( * ) Notice: Subject to any disclaimer, the term of this patent is extended or adjusted under 35 U.S.C. 154(b) by 307 days.

(21) Appl. No.: 10/503,797

(22) PCT Filed: Feb. 5, 2003

(86) PCT No.: PCT/US03/03464

§ 371 (c)(1),
(2), (4) Date: Aug. 6, 2004

(87) PCT Pub. No.: WO03/066374

PCT Pub. Date: Aug. 14, 2003

(65) Prior Publication Data

US 2005/0169002 A1 Aug. 4, 2005

Related U.S. Application Data

(60) Provisional application No. 60/354,716, filed on Feb. 6, 2002.

(51) Int. Cl.
*B60Q 1/00* (2006.01)
(52) U.S. Cl. .................. 362/487; 362/543; 362/544; 362/545; 362/546

(58) Field of Classification Search ........ 362/249–252, 362/544, 555, 487, 543, 518, 546, 298, 301, 362/346, 545, 539
See application file for complete search history.

(56) References Cited

U.S. PATENT DOCUMENTS

| | | | |
|---|---|---|---|
| 4,337,759 A | 7/1982 | Popovich et al. |
| 5,404,869 A | 4/1995 | Parkyn, Jr. et al. |
| 5,577,493 A | 11/1996 | Parkyn, Jr. et al. |
| 5,632,551 A | 5/1997 | Roney et al. |
| 5,700,080 A | 12/1997 | Okuda |
| 5,926,320 A | 7/1999 | Parkyn, Jr. et al. |

(Continued)

OTHER PUBLICATIONS

Teledyne Lighting & Display Products, Dynelamp Slimline Series, Product Sheet, 6 pgs., date unknown. Hawthorne, California USA.

*Primary Examiner*—Anabel M Ton

(57) ABSTRACT

A center high mounted stop lamp (12) including a plurality of LEDs (34) mounted on a printed circuit board (30). TIR lenses (40) are employed to focus the light from the LEDs (34) to give an even lighting appearance. The TIR lenses (40) include a prism (44) for directing the light in a desired direction. The circuit board (30) and lenses (40) are mounted in a housing (18) so that each LED (34) includes a separate lens (40) configured relative thereto to provide the desired collection and reflectance of the light. The housing (18) includes a plurality of posts (70) that extend through openings (48, 50) in the circuit board (30) and the lenses (40) to align the LEDs (34) to the lenses (40) relative to the housing (18).

49 Claims, 8 Drawing Sheets

U.S. PATENT DOCUMENTS

| | | |
|---|---|---|
| 6,015,223 A | 1/2000 | Kidd et al. |
| 6,097,549 A * | 8/2000 | Jenkins et al. ............. 359/726 |
| 6,134,092 A | 10/2000 | Pelka et al. |
| 6,177,761 B1 | 1/2001 | Pelka et al. |
| 6,245,259 B1 | 6/2001 | Hohn et al. |
| 6,250,774 B1 | 6/2001 | Begemann et al. |
| 6,516,689 B1 * | 2/2003 | Bates ............................ 81/60 |
| 6,520,669 B1 * | 2/2003 | Chen et al. ................. 362/545 |
| 6,851,839 B2 * | 2/2005 | Malone et al. ............. 362/487 |
| 7,025,485 B2 * | 4/2006 | Henry ....................... 362/545 |
| 2003/0031028 A1 * | 2/2003 | Murray et al. ............. 362/545 |

* cited by examiner

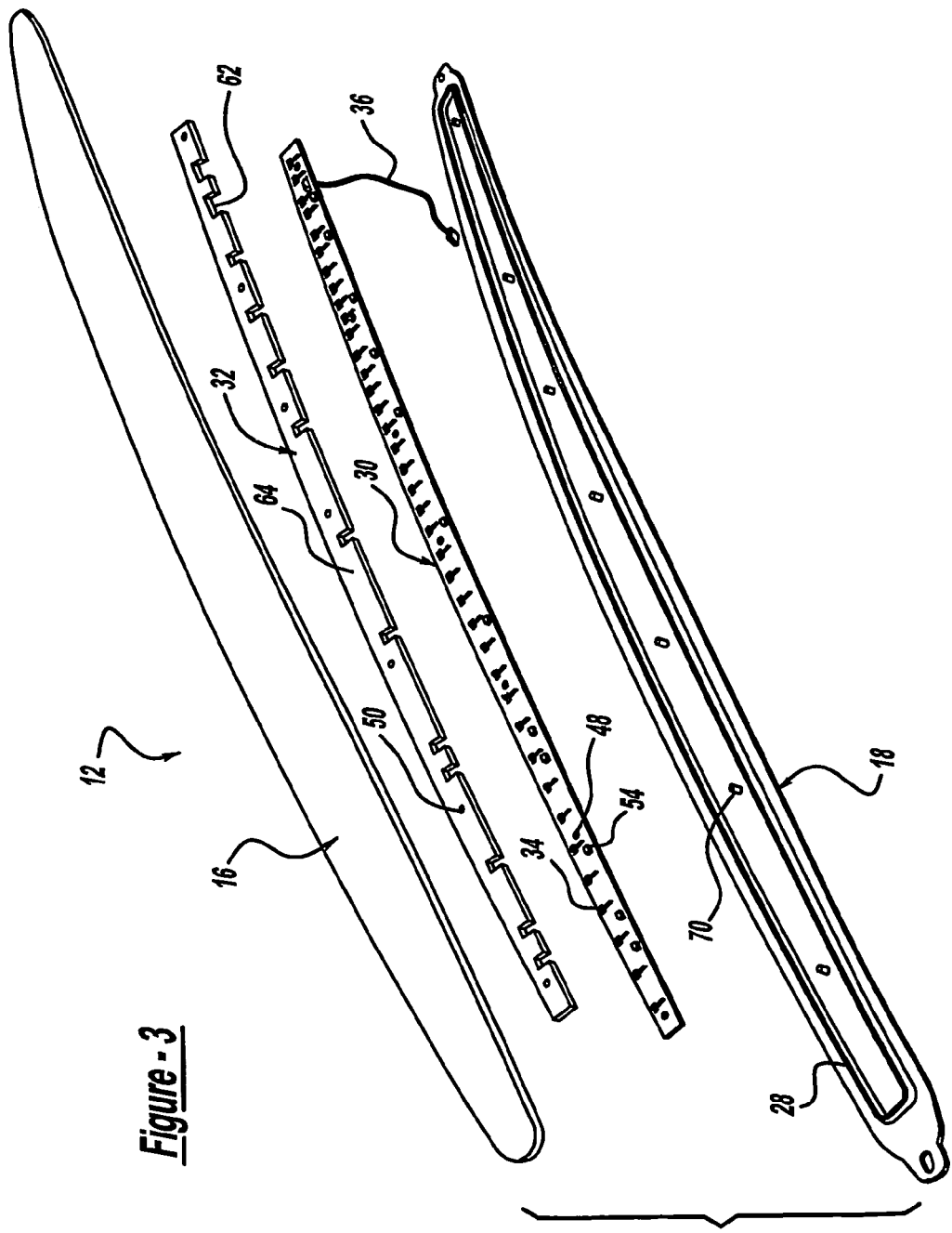

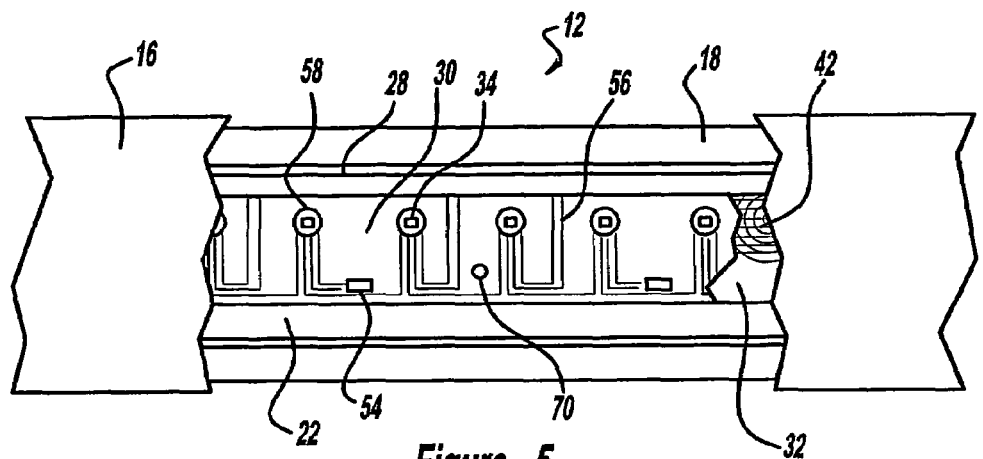
Figure - 5
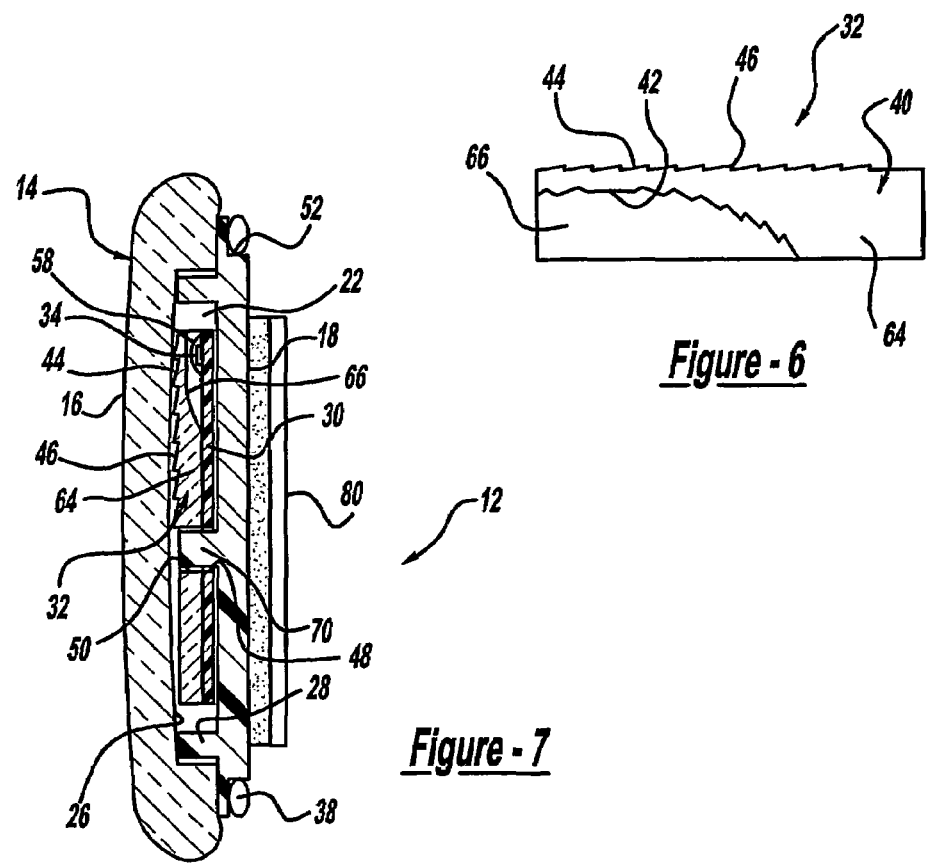
Figure - 6
Figure - 7

_US 7,374,322 B2_

CENTER HIGH MOUNTED STOP LAMP INCLUDING LEDS AND TIR LENS

BACKGROUND OF THE INVENTION

1. Field of the Invention

This invention relates generally to vehicle lighting employing light emitting diodes (LEDs) and, more particularly, to automotive signal lighting, such as a center high mounted stop lamp (CHMSL) for a vehicle, where the CHMSL employs LEDs and a TIR lens assembly.

2. Discussion of the Related Art

Vehicle styling and appearance provides significant and important advantages for attracting customers. One recognized area that is known to enhance vehicle attraction is the appearance and design of the various vehicle lights, sometimes referred to as the vehicle's jewels, including, but not limited to, headlights, tail lights, turn signals, back-up lights, CHMSLs, running lights, fog lamps, etc. In fact, modem vehicle designs pay close attention to the styling and design of the vehicle lights.

Current vehicle lights employ various types of light sources suitable for different designs and conditions. For example, vehicle lighting designs have employed incandescent lamps, neon bulbs, halogen lamps, etc. Some modem vehicle light designs have employed light emitting diodes (LEDs) that are able to provide different colors in an inexpensive and durable arrangement. Known LED designs for vehicles have employed LEDs mounted on a circuit board, where the circuit board is secured within a housing. A total internal reflecting (TIR) lens is positioned over each LED to collect most of the light emitted therefrom and focus it in for a field pattern. A lens of this type is disclosed in U.S. Pat. No. 5,404,869 titled "Faceted Totally Internally Reflecting Lens with Individually Curved Faces on Facets," issued Apr. 11, 1995 to Parkyn, Jr. et al. This combination of LEDs and lenses provides high intensity light at relatively low power.

Vehicle lights are typically mounted in class A vehicle body panels. Because typical vehicle lights have a thickness in the range of 40-70 mm, the recessed area for the light cannot be stamped in the vehicle body panel because metal stamping operations providing the necessary depth that will wrinkle, tear and damage the body panel. Thus, it is necessary to weld a separate metal pocket to a hole cut in the body panel to provide the recessed area for the vehicle light. However, the separate metal pocket causes variations in the welding process, variations in the alignment tooling for holding the pocket to the body panel and variations in the actual pocket itself, sometimes resulting in poorly fitting light assemblies in the body panel. Further, the connection point between the pocket and the body panel has to be sealed. Thus, the pocket increases the vehicle part count, requires more assembly time, and possibly creates leaks. Because LED assemblies for vehicle lights can typically be thin, these designs are sometimes conducive to be mounted in stamped recesses in vehicle body panels. However, heretofore, such designs have been limited and ineffective.

SUMMARY OF THE INVENTION

In accordance with the teachings of the present invention, a vehicle light is disclosed that employs a plurality of LEDs that are mounted on a printed circuit board. TIR lenses are coupled to the LEDs to collect and focus the light from the LEDs to give an even lighting appearance. In one embodiment, the TIR lenses include a prism for directing the light in a desired direction. The circuit board and lenses are mounted in a housing so that each LED includes a separate lens precisely aligned thereto to provide the desired collection and focusing of the light. An outer lens is then rigidly secured to the housing. The housing and/or outer lens include a plurality of datum points to align the circuit board and the lenses relative to each other. In one embodiment, the datum points are posts integrally molded to a base portion of the housing. The posts are inserted through cooperating holes in the circuit board and the TIR lenses. In an alternate embodiment, the TIR lenses are a part of a common body, where alignment tabs of different lengths extend from an edge of the body. The circuit board includes a series of cooperating slots around its outer edge. The tabs are inserted in the slots to align the lenses to the LEDs. In one embodiment, the housing includes an integral electrical connector including rigid electrodes that eliminates wires.

Additional advantages and features of the present invention will become apparent from the following description and appended claims, taken in conjunction with the accompanying drawings

BRIEF DESCRIPTION OF THE DRAWINGS

FIG. 3 is an exploded, perspective view of the CHMSL shown in FIG. 2;

FIG. 5 is a cut-away top view of the CHMSL shown in FIG. 2 with an upper housing portion removed;

FIG. 6 is a cross-sectional view of the TIR lens assembly removed from the CHMSL;

FIG. 7 is a cross-sectional view of the CHMSL shown in FIG. 2, according to another embodiment of the present invention;

DETAILED DESCRIPTION OF THE EMBODIMENTS

The following discussion of the embodiments of the invention directed to an LED assembly for a vehicle is merely exemplary in nature and is in no way intended to limit the invention, or its application or uses. For example, the discussion below is particularly directed to a CHMSL for a vehicle employing an LED design. However, as will be appreciated by those skilled in the art, the LED design of the present invention may have application for other vehicle lights.

Figure 1:
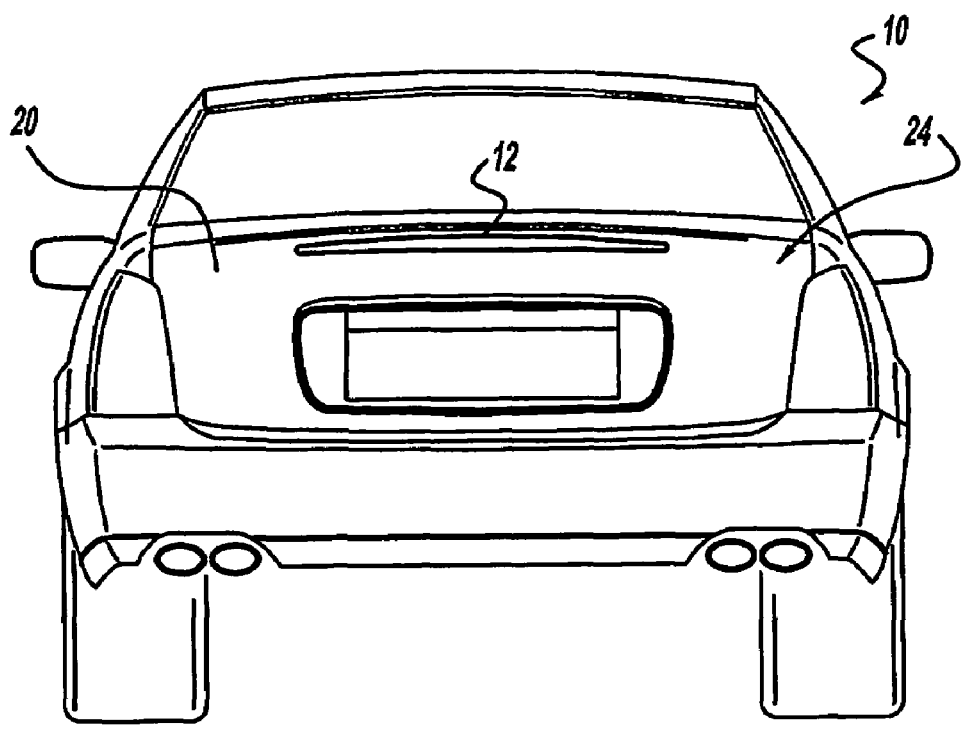
FIG. 1 is a rear view of a vehicle including a CHMSL, according to an embodiment of the present invention.

FIG. 1 is a rear view of a vehicle 10 including a CHMSL 12, according to an embodiment of the present invention. As is known in the art, a CHMSL is a light device conspicuously positioned at the rear of a vehicle that allows drivers to readily determine that the vehicle in front of them is braking. CHMSLs are known to come in a variety of designs and can be mounted to the vehicle in a variety of locations.

CHMSLs offer vehicle designers the ability to provide an aesthetically pleasing appearance, and to establish vehicle identity. The CHMSL 12 in this design is mounted to a body panel 20 of a trunk 24 of the vehicle 10 in a manner that will be discussed in more detail below. As will also be discussed below, the CHMSL 12 of the invention employs LED technology to provide certain design and lighting advantages.

Figure 4:
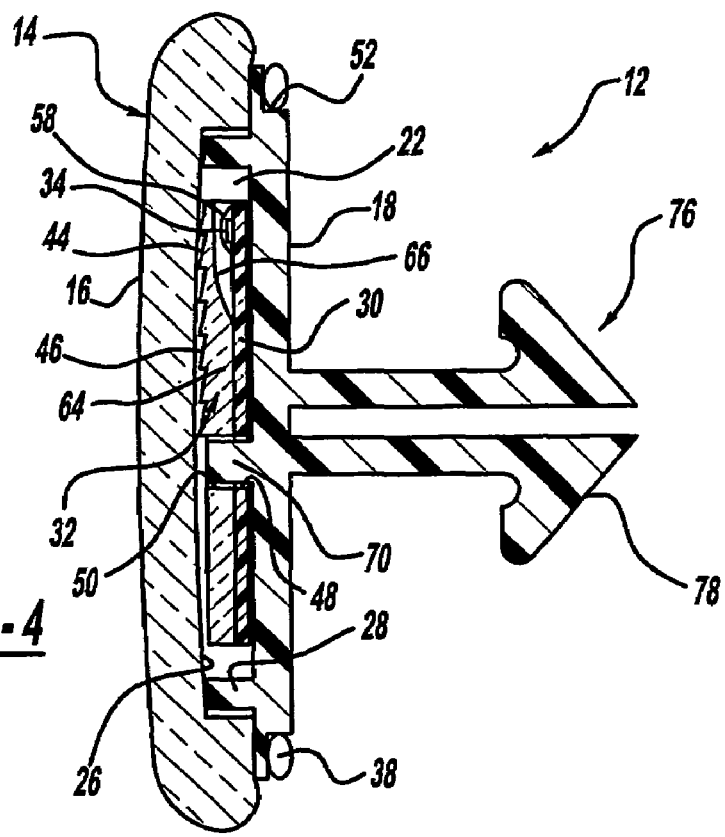
FIG. 4 is a cross-sectional view of the CHMSL shown in FIG. 2 through line 4-4.
Figure 2:
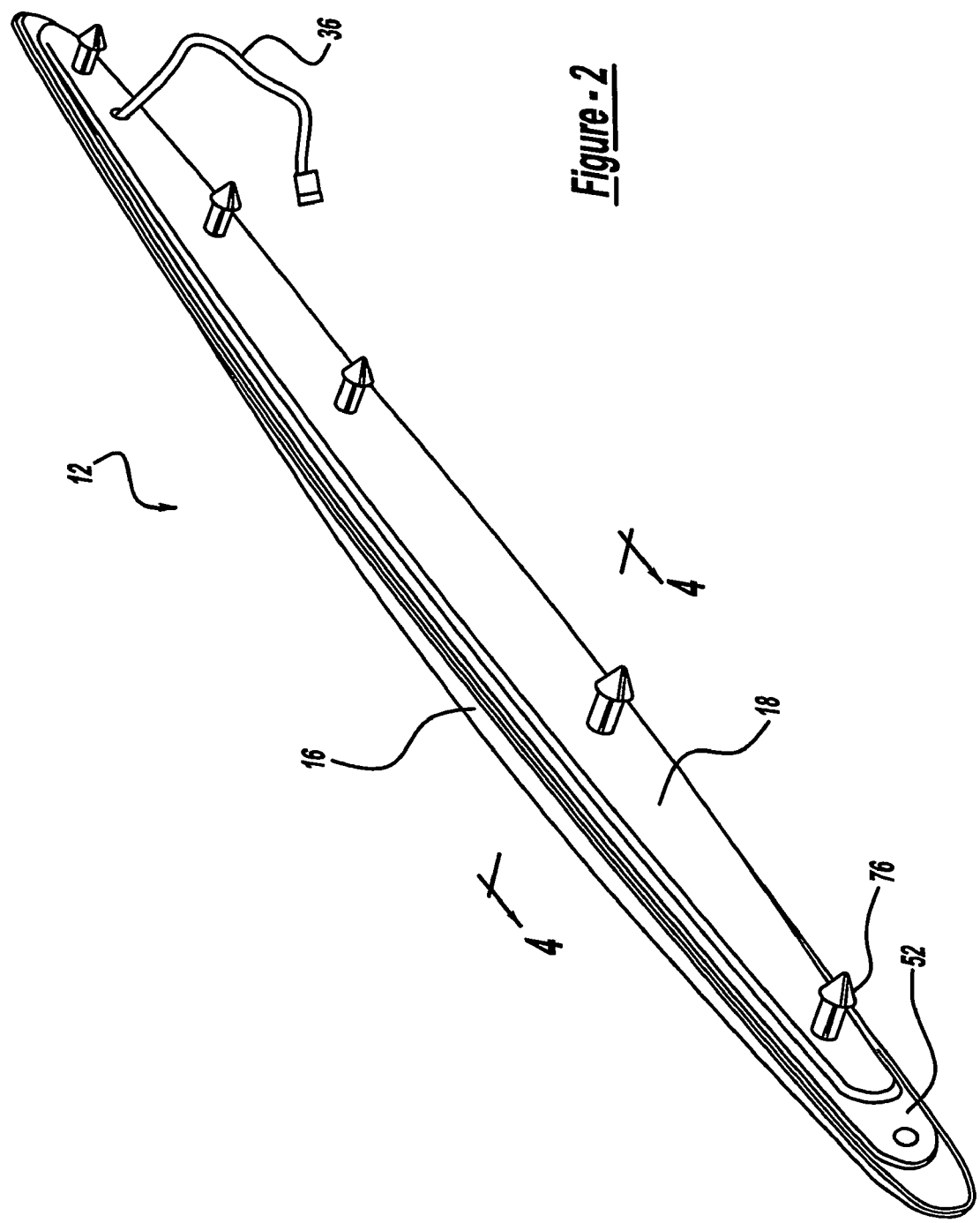
FIG. 2 is a rear, perspective view of the CHMSL shown in FIG. 1 removed from the vehicle.

FIG. 2 is a perspective view, FIG. 3 is an exploded perspective view and FIG. 4 is a cross-sectional view of the CHMSL 12 removed from the vehicle 10. The CHMSL 12 includes an enclosure 14 made of a single piece outer lens 16 and a single piece housing 18. The outer lens 16 has a certain elongated curved appearance in this design, but as will be appreciated by those skilled in the art, this is merely by way of example in that any other suitable shape can be provided. The outer lens 16 and the housing 18 are plastic parts molded by a suitable molding process, such as injection molding. The outer lens 16 and the housing 18 can be made of any plastic, such as polycarbonate and acrylic, that is suitable to stand up to the rigors of the vehicle environment and provide the desired appearance and color. Further, the lens 16 has any suitable optical quality, translucence and color. In this example, the lens 16 is red in appearance.

The lens 16 includes a recessed area 26 that accepts a rim 28 of the lower housing 18 so as to define a cavity 22 when the outer lens 16 is secured to the lower housing 18, as shown. The outer lens 16 and the housing 18 are secured together by any suitable technique, such as gluing, sonic welding, heat welding, etc. A seal 38 is provided in an outer notch 52 of the lower housing portion 18 to provide a seal surface that seals the CHMSL 12 to a cooperating edge in an opening in the body panel 20.

The CHMSL 12 includes a printed circuit board (PCB) 30 and an TIR lens assembly 32 mounted within the enclosure 14. FIG. 5 is a cut-away, top view of the CHMSL 12. The PCB 30 includes a plurality of LEDs 34 mounted thereto. In this embodiment, the LEDs 34 are "chip on board" LEDs in that they are mounted to the PCB 30 and interconnected with other circuit elements 54, such as resistors, as components when the PCB 30 is manufactured. In other words, instead of the LEDs 34 being formed in a separate protective package prior to being mounted to the PCB 30 and interconnected to the circuit elements 54, the LEDs 34 are mounted to the PCB 30 in their component state. This saves assembly and part costs. The lens assembly 32 includes a plurality of cut-out portions 62 that accommodate the various circuit elements 54.

The several LEDs 34 and the circuit elements 54 are interconnected on the PCB 30 by electrical traces 56. Wires 36 are electrically coupled to the PCB 30 and to the vehicle electrical system to provide power to the LEDs 34. Protective layers are deposited over the LEDs 34 and the rest of the board 30. In this example, a dome 58 of a suitable protective material, such as polyurethane, is deposited over each LED 34 after the LEDs 34 are attached to and coupled within the PCB 30. In one embodiment, the inner lens assembly 32 is heat staked to the PCB 30 and the housing 18. However, other suitable techniques of securing the lens assembly 32 and the PCB 30 within the enclosure 14 can be used.

The number of LEDs 34, the size of the LEDs 34, the color of the LEDs 34 and the spacing between LEDs 34 are all application specific in that different designs can be made differently to satisfy different system requirements. LEDs 34 that provide certain colors require different semiconductor materials. For example, AlInGaP semiconductor materials provide colors in the red to amber wavelengths. InGaN semiconductor materials provide colors in the green to ultraviolet wavelengths. LEDs that emit white light are known by employing certain semiconductor materials in combination with phosphorous. U.S. Pat. No. 6,069,440 issued to Shimizu et al. discloses a white light emitting diode.

The lens assembly 32 is a single body member 64 made of a suitable transparent optical plastic by a suitable process, such as injection molding. FIG. 6 is a cross-sectional view of the lens assembly 32 separated from the housing 14. The assembly 32 includes a plurality of TIR lenses 40, where a separate lens 40 is provided for each LED 34 and is aligned relative thereto. In alternate embodiments, the assembly 32 can be several lens assemblies each including a plurality of lenses 40. Each lens 40 includes a hemispherical cavity 66 including a grating 42 that collects and focuses light from the associated LED 34. Because the LEDs 34 are "chip on board," they do not include the LED packaging of known designs, and thus, the light emitted therefrom is dispersed in all directions and not just at a particular angle. Therefore, the associated lens 40 can be positioned directly adjacent the LED 34 where the body member 64 contacts the PCB 30, thus allowing the packaging to be thinner.

According to the invention, the lens assembly 32 includes a prism 44 formed to an upper surface of the body member 64 opposite to the LEDs 34. Because the CHMSL 12 is mounted to the vehicle 10 at an angle (such as 10°) relative to the road surface because of the shape of the trunk 24, the present invention proposes employing the prism 44 to redirect the light in a more parallel direction relative to the road surface. The prism 44 is integrally molded as part of the body member 64. The prism 44 includes a series of diffraction lines 46 that redirect the light in a desirable direction.

To provide the desirable collection and focusing of light from the LEDs 34, the lens 40 must be accurately aligned to its respective LED 34. To provide this alignment, the present invention proposes a series of datum points to which the PCB 30 and the lens assembly 32 can be aligned. Particularly, a plurality of spaced apart posts 70 are integrally molded to the lower housing 18, as shown. The posts 70 extend through associated holes 48 in the PCB 30 and associated holes 50 in the body member 64. Thus, each lens 40 is closely aligned with its respective LED 34 to provide the highest degree of collection and focussing of the light. The posts 70 and the holes 48 and 50 compensate for thermal expansion and contraction between the housing 14, the PCB 30 and the lens assembly 32. In one embodiment, the CHMSL 12 employs at least three posts 70 to provide the desired alignment.

The combination of the chip on board LEDs 34 and the lens assembly 32 allows the CHMSL 12 to be made quite thin. In this embodiment, the CHMSL 12 is about 11 mm thick. Because the CHMSL 12 is relatively thin, the recess in the body panel 20 that the CHMSL 12 is mounted in can be relatively shallow. Thus, the recess can be formed in the body panel 20 by a metal stamping operation without wrinkling or otherwise damaging the body panel 20. Known CHMSLs and other vehicle lights are relatively thick, requiring the recess to be formed by welding body parts together. This increased the assembly cost and vehicle part count. Further, the connection point between the parts needs to be sealed to prevent leakage. By employing a stamping process, only mounting holes and holes for the wires 36 need to be made in the body panel 20. Alternately, a hole is pierced in the panel 20 and gaskets are provided on the CHMSL 12 to seal the holes to the environment.

In this embodiment, the CHMSL 12 is mounted to the body panel 20 by mounting posts 76. The mounting posts 76 include a snap fit end 78 that allows the CHMSL 12 to be snap fit to the body panel 20. The posts 76 are inserted through holes in the body panel 20, and the ends 78 snap behind the panel 20 to hold the CHMSL 12 in place. Other types of mounting posts suitable for mounting the CHMSL 12 to the body panel 20 can also be used within the scope of the present invention.

Further, the CHMSL 12 is relatively light. Therefore, the CHMSL 12 can be taped to the body panel 20. FIG. 7 is a cross-sectional view of the CHMSL 12, according to another embodiment of the invention, where the posts 76 have been replaced with a piece of double-sided tape 80. The CHMSL 12 is secured to the body panel 20 by the tape 60.

Figure 8:
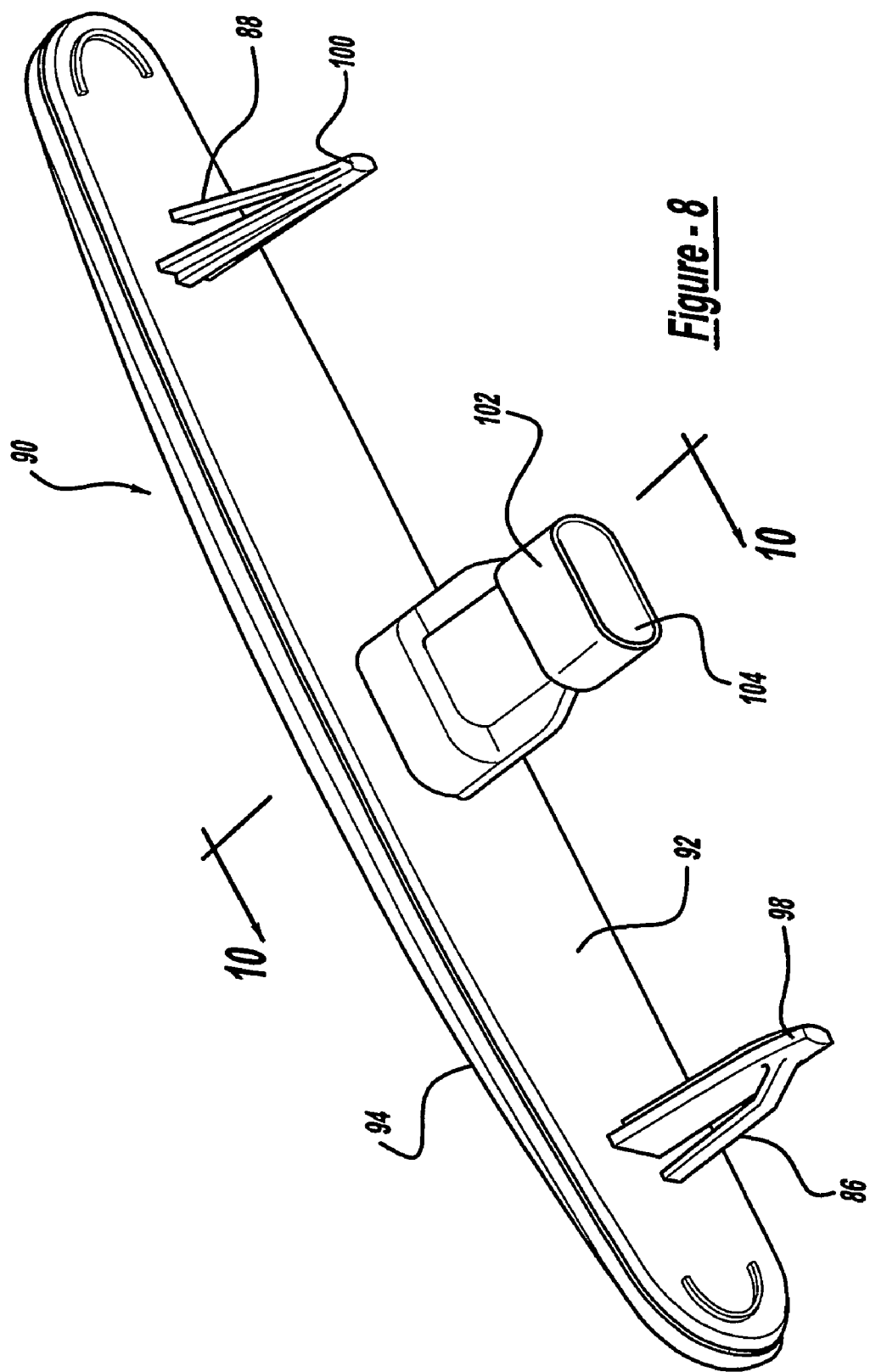
FIG. 8 is a rear, perspective view of a CHMSL, according to another embodiment of the present invention.
Figure 9:
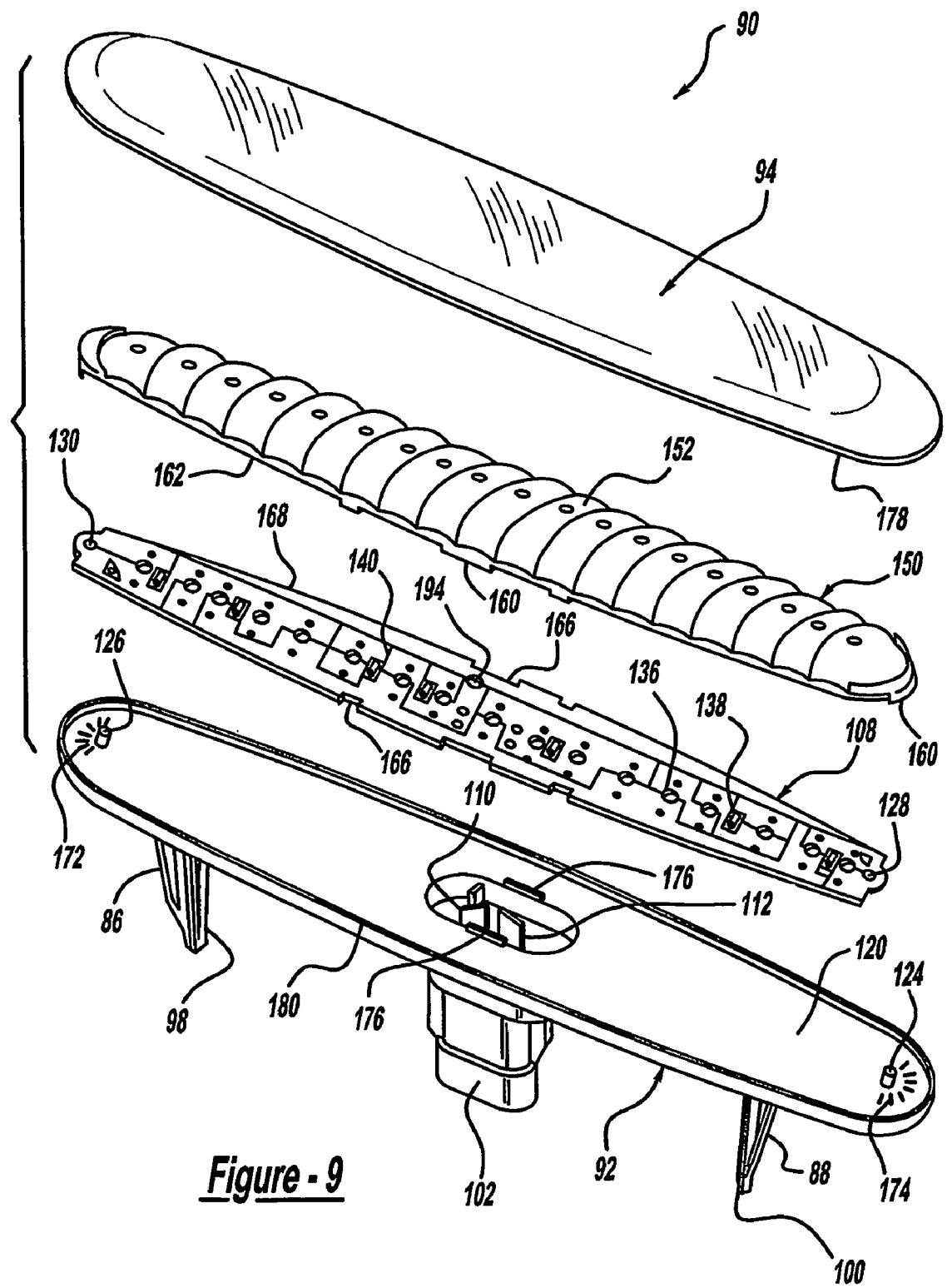
FIG. 9 is an exploded, perspective view of the CHMSL shown in FIG. 8.
Figure 10:
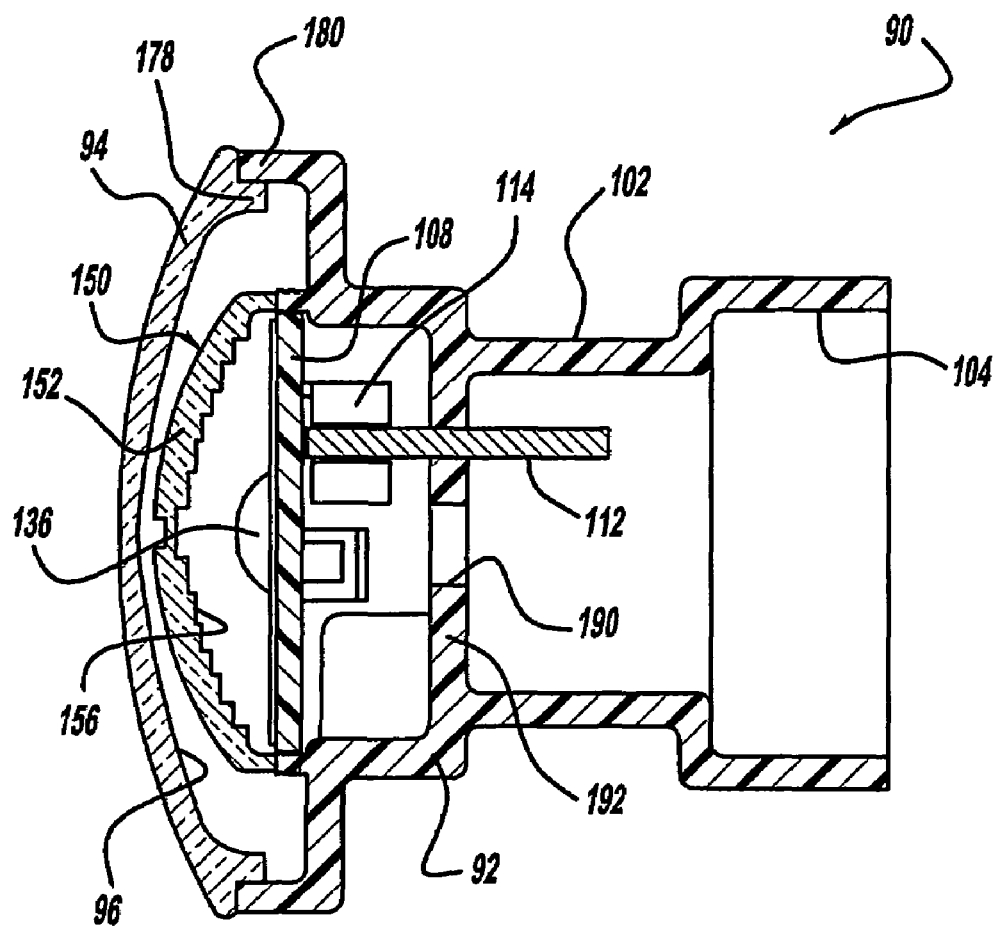
FIG. 10 is a cross-sectional view through line 10-10 of the CHMSL shown in FIG. 8.
Figure 11:
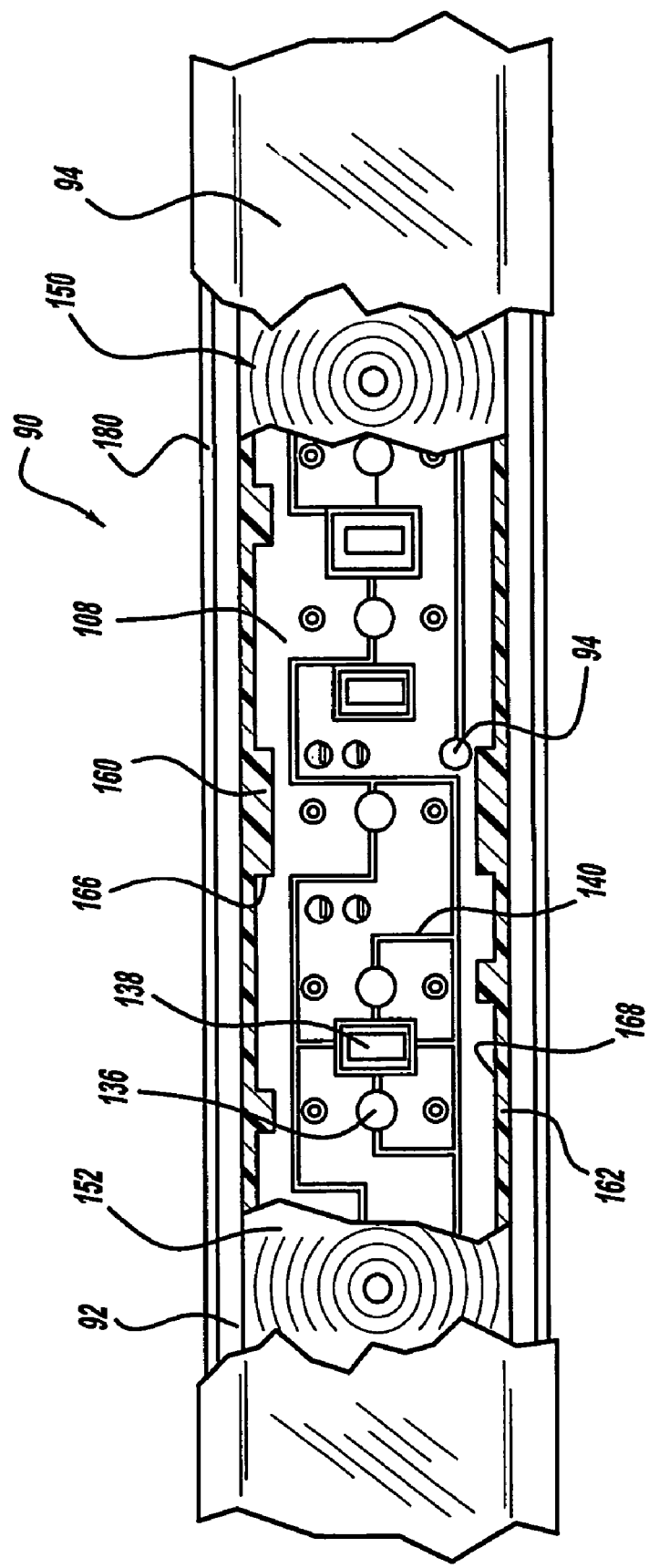
FIG. 11 is a cut-away top view of the CHMSL shown in FIG. 8.

FIG. 8 is a rear perspective view, FIG. 9 is an exploded perspective view, FIG. 10 is a cross-sectional view through line 10-10 in FIG. 8 and FIG. 11 is a cut-away top view of a CHMSL 90, according to another embodiment of the present invention. The CHMSL 90 includes a single piece plastic housing 92 and an outer lens 94 secured thereto by a suitable adhesive or the like to define a cavity 96 therein. The housing 92 includes mounting posts 98 and 100 having resilient tabs 86 and 88, respectively, that are inserted through holes in the body panel 20, where the tabs 86 and 88 flex to secure the CHMSL 90 thereto.

The housing 92 further includes an integral connector 102 defining a chamber 104 therein. Electrodes 110 and 112 are secured within the plastic forming the connector 102, and are electrically coupled to electrical connectors 114 mounted to a PCB 108. When the CHMSL 90 is mounted to the body panel 20, a vehicle mating connector (not shown) is inserted into the chamber 104 so that the electrodes 110 and 112 make electrical contact with an electrical system that provides power to the PCB 108. Thus, the CHMSL 90 eliminates wires that could otherwise break affecting the integrity of the CHMSL 90.

The PCB 108 is mounted to an inner surface 120 of the housing 92 within the cavity 96. The PCB 108 is aligned to the housing 120 by inserting posts 124 and 126 integrally molded to the housing 92 through holes 128 and 130, respectively, formed through the PCB 108. Also, the electrodes 110 and 112 are inserted within the respective connector 114 to provide the electrical connection and help hold the PCB 108 in place. The PCB 108 includes a plurality of LEDs 136 mounted thereto. In this embodiment, the LEDs 136 are also "chip on board" LEDs in that they are mounted to metal portions on the PCB 108 and are interconnected with other circuit elements 138 by electrical traces 140, as discussed above.

A TIR lens assembly 150, similar to the lens assembly 32 discussed above, is also mounted within the cavity 96 relative to the PCB 108. As above, the lens assembly 150 includes a plurality of lenses 152, where a separate lens 152 is positioned relative to each LED 136. The lens assembly 150 is a single body member made of a suitable transparent optical plastic by a suitable process, such as injection molding. Each lens 152 includes a grating 156 that collects and focuses light from the associated LED 136, as discussed above.

The lens assembly 150 includes a plurality of tabs 160 extending downward from an edge or rim 162 of the assembly 150, as shown. Further, the PCB 108 includes a plurality of associated slots 166 formed in an outer edge 168 of the PCB 108, as shown. Each tab 160 has a particular length, width and location so that it can be inserted into an associated slot 166 having the same length, width and location. Therefore, by properly positioning the lens assembly 150 relative to the PCB 108 within the cavity 96, each lens 152 will properly align to its respective LED 136.

In this embodiment, the lens assembly 150 and the PCB 108 are secured to the surface 120 of the housing 92 by sonic welding or by a sonic tack. A series of integral energy directors are provided on the surface 120 to accept the heat from the sonic tack. Particularly, energy directors 170 are provided proximate the post 124, energy directors 172 are provided proximate the post 126, and energy directors 176 are provided proximate the connector 102, as shown. When the PCB 108 and the lens assembly 150 are aligned relative to each other within the cavity 96. The bottom surface of some of the tabs 160 are positioned directly over and in contact with the energy directors 170, 172 and 176. Sonic energy is applied to the energy directors 170, 172 and 176 and the lens assembly 150 to secure the lens assembly 152 to the housing 92 and hold the PCB therebetween. This technique allows the CHMSL 90 to be formed in a curved manner to conform with the body panel 20.

The outer lens 94 is then positioned on the housing 92 so that a rim 178 of the outer lens 94 aligns with an edge 180 of the housing 92 to be glued thereto. Once the cavity 96 is sealed by securing the outer lens 94 to the housing 92, the integrity of the seal is tested by determining if the cavity 96 can hold a vacuum pressure. It is important that the cavity 96 be sealed so that moisture does not enter the cavity 96 during vehicle operation that would otherwise reduce its performance. To provide the pressure test, a vent hole 190 is provided through a wall 192 in the chamber 104. Additionally, a vent hole 194 is provided in the PCB 108 so that the cavity 96 is in fluid communication with the hole 190. During testing, a pressure device is coupled to the socket 102 to remove air from the cavity 96 to determine the seal integrity.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A vehicle light for a vehicle, said vehicle light comprising:

a housing, said housing including at least one datum point; an outer lens mounted to the housing and defining a cavity therebetween;

a printed circuit board (PCB) mounted to the housing, said printed circuit board including a plurality of spaced apart LEDs mounted thereto, said printed circuit board further including at least one alignment point aligned to the datum point;

a lens assembly mounted to the housing, said lens assembly including a plurality of spaced apart lenses where a separate lens is mounted relative to each LED, said lens assembly further including at least one alignment point aligned with the at least one datum point or the at least one printed circuit board alignment point to provide the desired alignment between each said separate lens and each said LED; and wherein the at least datum point includes a post integrally molded to the housing and extending into the cavity, wherein the at least one printed circuit board alignment point is a hole and the at least one lens assembly alignment point is a hole where the post extends through the holes.

2. The vehicle light according to claim 1 wherein the at least one datum point, the at least one printed circuit, board alignment point and the at least one lens assembly alignment point are a plurality of datum points and alignment points.

3. The vehicle light according to claim 1 wherein the at least one post is a plurality of posts and the at least one hole in the printed circuit board and the at least one hole in the lens assembly is a plurality of holes so that each post extends through an associated hole in the printed circuit board and the lens assembly.

4. A vehicle light for a vehicle, said vehicle light comprising:
   a housing, said housing including at least one datum point; an outer lens mounted to the housing and defining a cavity therebetween;
   a printed circuit board (PCB) mounted to the housing, said printed circuit board including a plurality of spaced apart LEDs mounted thereto, said printed circuit board further a plurality of alignment slots formed in an outer edge of the printed circuit board and aligned to the datum point, said plurality of alignment slots having different lengths formed in an outer edge of the printed circuit board,
   a lens assembly mounted to the housing, said lens assembly including a plurality of spaced apart lenses where a separate lens is mounted relative to each LED, said lens assembly further including a plurality of tabs aligned with said at least one datum point or said plurality of alignment slots of said printed circuit board, said plurality of alignment tabs having different lengths where each tab is configured to be positioned within a slot to align the lens assembly to the printed circuit board.

5. The vehicle light according to claim 1 wherein the lens assembly includes a prism, said prism operable to redirect the light emitted from the LEDs and focused by the lenses.

6. The vehicle light according to claim 1 wherein the lens assembly is a single molded plastic piece.

7. The vehicle light according to claim 1 wherein the lens assembly is a total internal reflecting lens assembly.

8. The vehicle light according to claim 1 wherein the lens assembly and the printed circuit board are heat staked or sonic welded to the housing.

9. A vehicle light for a vehicle, said vehicle light comprising:
   a housing, said housing including at least one datum point; and outer lens mounted to the housing and defining a cavity therebetween;
   wherein the housing includes a plurality of energy directors, said energy directors being integrally molded with the housing and providing flowable plastic for securing a lens assembly to the housing in response to a sonic tack;
   a printed circuit board (PCB) mounted to the housing, said printed circuit board including a plurality of spaced apart LEDs mounted thereto, said printed circuit board further including at least one alignment point aligned to the datum point; and
   wherein, said lens assembly includes a plurality of spaced apart lenses where a separate lens is mounted relative to each LED, said lens assembly further including at least one alignment point aligned with the at least one datum point or the at least one printed circuit board alignment point to provide the desired alignment between each said separate lens and each said LED.

10. The vehicle light according to claim 1 further comprising an electrical connector, said electrical connector being integrally molded with the housing and including electrodes secured thereto.

11. The vehicle light according to claim 10 wherein the printed circuit board includes printed circuit board contacts, said printed circuit board contacts being electrically coupled to the housing electrodes by a friction engagement.

12. A vehicle light for a vehicle, said vehicle light comprising:
    a housing, said housing including at least one datum point; an outer lens mounted to the housing and defining a cavity therebetween;
    a printed circuit board (PCB) mounted to the housing, said printed circuit board including a plurality of spaced apart LEDs mounted thereto, said printed circuit board further including at least one alignment point aligned to the datum point;
    a lens assembly mounted to the housing, said lens assembly including a plurality of spaced apart lenses where a separate lens is mounted relative to each LED, said lens assembly further including at least one alignment point aligned with the at least one datum point or the at least one printed circuit board alignment point to provide the desired alignment between each said separate lens and each said LED; and
    wherein the housing includes a housing vent hole and the printed circuit board includes a printed circuit vent hole, said vent holes being in fluid communication with the cavity.

13. The vehicle light according to claim 1 wherein the light has a thickness of about 11 mm or less.

14. The vehicle light according to claim 1 further comprising a tape strip, said tape strip being mounted to a surface of the housing opposite to the printed circuit board, said tape strip operable to secure the vehicle light to the vehicle.

15. The vehicle light according to claim 1 wherein the housing and the outer lens are secured together by a technique selected from the group consisting of gluing, sonic welding and heat welding.

16. The vehicle light according to claim 1 wherein the vehicle light is a center high mounted stop lamp (CHMSL).

17. A vehicle light for a vehicle, said vehicle light comprising:
    a housing, said housing including a plurality of posts integral therewith;
    an outer lens mounted to the housing and defining a cavity therebetween;
    a printed circuit board (PCB) mounted within the housing, said printed circuit board including a plurality of spaced apart LEDs mounted thereto, said printed circuit board further including a plurality of PCB holes where a separate PCB hole is aligned with each post; and
    a total internal reflected (TIR) lens assembly mounted within the housing, said TIR lens assembly including a plurality of spaced apart TIR lenses where each LED includes a separate TIR lens mounted relative thereto, said TIR lens assembly further including a plurality of lens assembly holes where a separate lens assembly hole is aligned with each post and each PCB hole, each post extending through an associated PCB hole and lens assembly hole.

18. The vehicle light according to claim 17 wherein the TIR lens assembly includes a prism, said prism operable to redirect the light emitted from the LEDs and focused by the TIR lenses.

19. The vehicle light according to claim 17 wherein the housing includes a plurality of energy directors, said energy directors being integrally molded with the housing and providing flowable plastic for securing the lens assembly to the housing in response to a sonic tack.

20. The vehicle light according to claim 17 further comprising an electrical connector, said electrical connector being integrally molded with the housing and including electrodes secured thereto.

21. The vehicle light according to claim 20 wherein the printed circuit board includes printed circuit board contacts, said printed circuit board contacts being electrically coupled to the housing electrodes by a friction engagement.

22. A vehicle light for a vehicle, said vehicle light comprising:
   a housing, said housing including at least one datum point;
   an outer lens mounted to the housing and defining a cavity therein;
   a printed circuit board (PCB) mounted to the housing, said printed circuit board including a plurality of spaced apart LEDs mounted thereto, said printed circuit board further including at least one alignment point aligned to the datum point;
   a total internal reflecting (TIR) lens assembly mounted to the housing, said TIR lens assembly including a plurality of spaced apart TIR lenses where each LED includes a separate TIR lens mounted relative thereto, said TIR lens assembly further including at least one alignment point aligned with the at least one datum point to provide the desired alignment between the TIR lenses and the LED; and
   wherein the housing includes a plurality of energy directors, said energy directors being integrally molded with the housing and providing flowable plastic for securing the lens assembly to the housing in response to a sonic tack.

23. The vehicle light according to claim 22 wherein the light has a thickness of about 11 mm or less.

24. The vehicle light according to claim 22 wherein the TIR lens assembly is a single molded plastic piece.

25. The vehicle light according to claim 22 wherein the TIR lens assembly and the printed circuit board are heat staked or sonic welded to the housing.

26. The vehicle light according to claim 22 further comprising an electrical connector, said electrical connector being integrally molded with the housing and including electrodes secured thereto.

27. The vehicle light according to claim 26 wherein the printed circuit board includes printed circuit board contacts, said printed circuit board contacts being electrically coupled to the housing electrodes by a friction engagement.

28. The vehicle light according to claim 22 wherein the housing and the outer lens are secured together by a technique selected from the group consisting of gluing, sonic welding and heat welding.

29. The vehicle light according to claim 22 further comprising a tape strip, said tape strip being mounted to a surface of the housing opposite to the printed circuit board, said tape strip operable to secure the vehicle light to the vehicle.

30. The vehicle light according to claim 22 wherein the vehicle light is a center high mounted stop lamp (CHMSL).

31. A center high mounted stop lamp (CHMSL) for a vehicle, said CHMSL comprising: a housing, said housing including a plurality of posts integral therewith and extending into the cavity; an outer lens mounted to the housing and defining a cavity therein; a printed circuit board (PCB) mounted within the housing, said printed circuit board including a plurality of spaced apart LEDs mounted thereto, said printed circuit board further including a plurality of PCB holes where a separate PCB hole is aligned with each post; a total internal reflecting (TIR) lens assembly mounted within the housing, said TIR lens assembly including a plurality of spaced apart TIR lenses where each LED includes a separate TIR lens mounted relative thereto, said lens assembly including a plurality of alignment tabs for aligning the lens assembly to the printed circuit board; and an electrical connector, said electrical connector being integrally molded with the housing and including electrodes secured thereto.

32. The CHMSL according to claim 31 wherein the printed circuit board includes a plurality of alignment slots formed in an outer edge of the printed circuit board, wherein the alignment tabs are positioned in the alignment slots to align the lenses to the LEDs.

33. The CHMSL according to claim 32 wherein the plurality of alignment slots have different lengths and the plurality of alignment tabs have different lengths.

34. The CHMSL according to claim 31 wherein the lens assembly further includes a plurality of lens assembly holes where a separate lens assembly hole is aligned with each post and each PCB hole so that each post extends through an associated PCB hole and lens assembly hole.

35. The CHMSL according to claim 31 wherein the lens assembly includes a prism that is operable to redirect light emitted from the LEDs and focused by the TIR lenses.

36. The CHMSL according to claim 31 wherein the printed circuit board includes printed circuit board contacts, said printed circuit board contacts being electrically coupled to the housing electrodes by a friction engagement.

37. The CHMSL according to claim 31 wherein the housing includes a plurality of energy directors, said energy directors being integrally molded with the housing and providing flowable plastic for securing the lens assembly to the housing in response to a sonic tack.

38. The CHMSL according to claim 31 wherein the housing includes a housing vent hole and the printed circuit board includes a printed circuit vent hole, said vent holes being in fluid communication with the cavity.

39. The CHMSL according to claim 31 wherein the CHMSL has a thickness of about 11 mm or less.

40. The CHMSL according to claim 31 wherein the TIR lens assembly is a single molded plastic piece.

41. The CHMSL according to claim 31 further comprising a tape strip, said tape strip being mounted to a surface of the housing opposite to the printed circuit board, said tape strip operable to secure the CHMSL to the vehicle.

42. The CHMSL according to claim 31 wherein the TIR lens assembly and the printed circuit board are heat staked or sonic welded to the housing.

43. The CHMSL according to claim 31 wherein the housing and the outer lens are secured together by a technique selected from the group consisting of gluing, sonic welding and heat welding.

44. A vehicle light for a vehicle, said vehicle comprising:
   a housing;
   an outer lens mounted to the housing and defining a cavity therebetween;
   a printed circuit board mounted to the housing, said printed circuit board including a plurality of spaced apart LEDs mounted thereto, said printed circuit board including a plurality of alignment slots formed in an outer edge of the printed circuit board;

a lens assembly mounted to the housing, said lens assembly including a plurality of spaced apart lenses where each LED includes a separate lens mounted relative thereto, said lens assembly further including a plurality of alignment tabs that are positioned within the alignment slots of the printed circuit board to align the lenses to the LED; and wherein the housing includes a plurality of energy directors, said energy directors being integrally molded with the housing and providing flowable plastic for securing the lens assembly to the housing in response to a sonic tack.

45. The vehicle light according to claim 44 further comprising an electrical connector, said electrical connector being integrally molded with the housing and including electrodes secured thereto.

46. The vehicle light according to claim 45 wherein the printed circuit board includes printed circuit board contacts, said printed circuit board contacts being electrically coupled to the housing electrodes by a friction engagement.

47. The vehicle light according to claim 44 wherein the housing includes a housing vent hole and the printed circuit board includes a printed circuit vent hole, said vent holes being in fluid communication with the cavity.

48. The vehicle light according to claim 44 wherein the light has a thickness of about 11 mm or less.

49. The vehicle light according to claim 44 wherein the vehicle light is a center high mounted stop lamp (CHMSL).

* * * * *